INVENTOR.
ARTHUR H. YOUMANS

United States Patent Office 3,426,203
Patented Feb. 4, 1969

3,426,203
METHOD OF CORE ANALYSIS USING THERMAL NEUTRON CAPTURE CROSS SECTION
Arthur H. Youmans, Houston, Tex., assignor to Dresser Industries Inc., Dallas, Tex., a corporation of Delaware
Filed Jan. 4, 1965, Ser. No. 423,037
U.S. Cl. 250—83.6     5 Claims
Int. Cl. G01v 5/00

ABSTRACT OF THE DISCLOSURE

A preselected volume of a preselected standard material is irradiated at the earth's surface with a burst of fast neutrons, after which the decline of the thermal neutron population is measured.

A sample of the borehole formation is then mixed with the material of the earth's surface and further readings are made of the decline of the thermal neutron population in the mixture. The first measurements are then compared with the further measurements, the comparison forming a correction factor for measurements made of the decline of the thermal neutron population within the well bore per se.

This invention relates to methods and apparatus for investigating the character of subsurface earth formations, and is more particularly directed to methods and apparatus for analyzing cores and drill cuttings taken from earth boreholes.

In a certain copending application filed July 5, 1963, by A. H. Youmans, and bearing Ser. No. 292,927, and now abandoned, there are disclosed novel methods and apparatus for oil and gas well logging wherein subsurface formations are bombarded by a burst of fast neutrons, and, after a time interval sufficient for these fast neutrons to slow down to thermal energy, a measurement is made of the decline rate of the thermal neutron population in the bombarded formations. It is the purpose of such a measurement to determine the macroscopic capture cross section, of formations sought to be investigated, in order to determine the extent and nature of their fluid content.

Practically all fluids contained in subsurface earth formations are hydrogenous in character, and inasmuch as the thermal neutron capture cross section of hydrogen is quite high, the measured macroscopic capture cross section is an indication of the magnitude of the fluid filled pore volume of the reservoir rocks. Moreover, subsurface waters are generally high in content of chlorine, which is an element with exceptionally high thermal neutron capture cross section. Thus it is possible to distinguish between hydrocarbons on the one hand, and brine on the other hand, on the basis of the macroscopic capture cross section of the formation. This logging method is described for example in Transactions, AIME (Mar. 1964) p. 319, "Neutron Lifetime, A New Nuclear Log," by A. H. Youmans, E. C. Hopkinson, R. A. Bergan and H. I. Oshry.

It is well known that elements such as silicon, lithium, boron, manganese and gadolinium, which commonly occur in earth substances, also have substantial capture cross sections for thermal neutrons. Chlorine not only exists in brine, and therefore serves to indicate the presence of water in the formation, but also may be a constituent of certain rock matrices. In general, the presence of silicon, lithium, boron, etc., bears no relation whatsoever to any fluid which may be present, but instead relates to the chemical composition of the solid material in the formation. Thus, if the matrix of a given formation includes even a small percentage of an element such as boron or gadolinium, such a formation will exercise a much greater capturing effect on the thermal neutron population than will a formation having silicon dioxide or calcium carbonate, for example, resulting in a less accurate estimate of the fluid content of the formation than in the case of one which contains no boron or gadolinium.

Accordingly, it is useful to know the composition of a formation sought to be investigated, in order that allowance can be made for the effect of all matrix constituents and a quantitative determination of its fluid content may thereby be obtained. Heretofore, the composition of the formation substances has been obtained by making a chemical analysis of cores or drill cuttings obtained from preselected depths in the borehole. After the analysis has provided a percentage breakdown of the various elements which may be present, the "macroscopic" capture cross section may be computed for the formation in toto, not including any fluids therein. The computed macroscopic cross section of the formation materials may then be employed in the interpretation of the logging measurement hereinbefore mentioned, in order to indicate the type and extent of any fluids present in the subsurface formation being considered.

Heretofore, the method for determining the macroscopic neutron capture cross section of an earth sample has been to make a quantitative chemical analysis of the sample. However, this is not the ordinary sort of chemical analysis, where the commoner elements are ignored except when specifically sought to be measured. Since gadolinium, for example, will appreciably affect the macroscopic thermal neutron capture cross section of a sample, when it is present in amounts of only 2–3 parts per million, it is necessary for present purposes to detect and measure each and every element present in the sample. Such chemical analyses would be prohibitive in cost, and would also be impossible to obtain within a reasonable time.

These disadvantages of the prior art are overcome with the present invention and novel methods and apparatus are provided for directly measuring the thermal neutron capture cross section of drill cores, drill cuttings, or fluid samples taken from a borehole in the earth.

Accordingly, it is an object of the present invention to provide methods and apparatus for directly measuring a preselected nuclear reaction cross section of an earth sample without the necessity of making a prior analysis of the chemical composition of the sample.

It is also an object of the present invention to provide methods and apparatus for determining the macroscopic thermal neutron capture cross section of an earth sample without the necessity of making a prior analysis of the chemical composition of the sample.

It is also an object of the present invention to provide methods and apparatus for determining the macroscopic thermal neutron capture cross section of a sample of an earth formation sought to be investigated, determining in situ the rate of decline of a thermal neutron population in said earth formation, and thereafter utilizing said determination of said macroscopic cross section and said rate of decline to make a quantitative measurement of the fluid saturation of said earth formation.

These and other objects and features of the present invention will be apparent from the following detailed description, wherein reference is made to the figures of the accompanying drawings.

Figure 1:
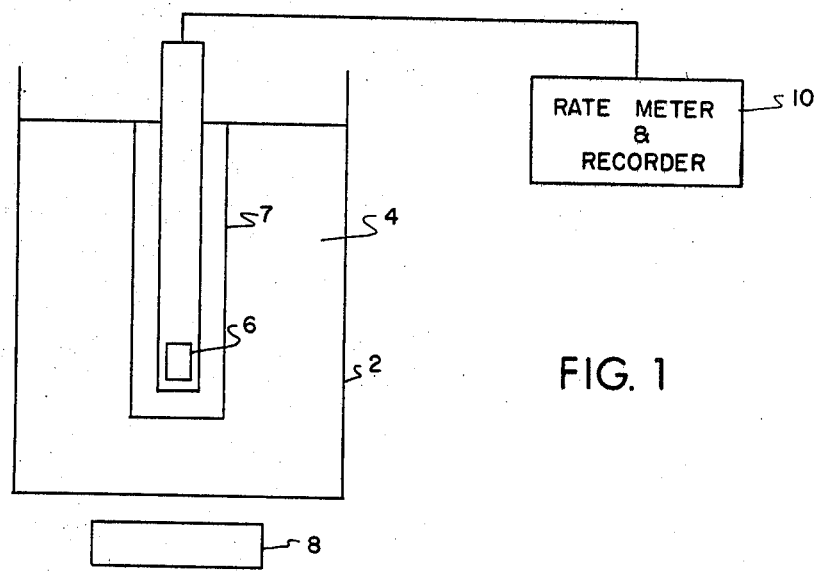
FIGURE 1 is a functional representation of apparatus suitable for measuring the macroscopic capture cross section of a sample of material.

The advantages of the present invention are preferably attained by first irradiating a preselected volume of a preselected standard material with a sharp burst of fast neutrons, and then measuring the rate of decline of the thermal neutron population created in the preselected material. Thereafter, the sample material sought to be investigated is positioned in or dispersed evenly throughout the preselected material, and the mixture is similarly irradiated so as to obtain a measurement of the decline rate of the thermal neutron population in the altered mixture, whereby the macroscopic capture cross section of the sample mateiral is determined as hereinafter described.

As stated in the aforementioned patent application S/N 292,927, there is presently available a commercial well logging technique wherein apparatus which includes a pulsated source of fast neutrons and at least one gated gamma ray detector is passed through a borehole. The neutron source is periodically actuated so as to irradiate adjacent substances with a series of sharp bursts, or "pulses," of high energy neutrons. The neutron pulses are preferably such that each includes substantially the same number of neutrons, and are separated in time sufficient so that the fast neutrons in each pulse bombard, slow down, and substantially disappear before the occurrence of each succeeding fast neutron pulse.

Each fast neutron pulse functions to create a fast neutron population of substantially the same intensity in the borehole and in the earth formation immediately adjacent thereto. However, these fast neutrons immediately undergo various nuclear reactions by collisions with nuclei in the borehole fluids and formations, and therefore slow to thermal energy at a rate which is functionally related to the character of the nuclei of the irradiated substances. The particular nuclear reaction which is produced by the collision of a neutron with a nucleus is a matter of probability, and further depends upon the character of the nucleus and the speed of the bombarding neutron. Any one of several possible reactions may occur when a particular neutron strikes a particular nucleus. However, the greater proportion of the fast neutrons in each will be either elastically or inelastically scattered, by the bombarded nuclei, until they slow to epithermal or thermal energies.

Thus it may be seen that each pulse of fast neutrons creates a "cloud" or "population" of fast neutrons in the regions of the borehole and earth formations surrounding the source, and that this fast neutron population declines in number as the fast neutrons are slowed by elastic and inelastic scattering reactions to thermal energy. Although the slowing process will, in any case, be extremely short in duration, its duration will nevertheless depend on the character of the bombarded nuclei.

Inelastic scattering reactions produce gamma rays in numbers, and having energies, which are indicative of the character of the bombarded nuclei. Thus, the creation of the fast neutron population will correspondingly result in the creation of a population of inelastic scattering gamma radiation in the formation, whereas elastic scattering reactions produce no detectable secondary radiations. Accordingly, a measurement of the decline in intensity of the secondary gamma radiation occurring as a result of the fast neutron bombardment, will furnish a direct indication of inelastic scattering of fast neutrons in the formation substances.

Also, it is possible to make a spectral analysis of the so-called "prompt" gamma radiation produced by fast neutron interactions, and thereby to select and measure only those gamma rays produced by neutron bombardment of preselected nuclei such as carbon. A measurement of variations in the intensity of the carbon-emitted gamma rays, as the source and detector are passed through the borehole, will furnish a very good indication of the proportion of carbon nuclei in one formation as compared to another.

After the fast neutrons substantially all slow to thermal energy, the fast neutron population will, of course, be "replaced" by a thermal neutron population. This thermal neutron population will then decline in number, generally at a much slower rate, since a thermal neutron may undergo many collisions with the irradiated nuclei before being captured. Thus, the thermal neutron population in the borehole and surrounding earth will decline at a rate which is directly related to the macroscopic capture cross section of the materials in which the neutrons are diffused. This rate of decline, though quite rapid by ordinary standards, may be easily measured by well logging apparatus which is now commercially available. Accordingly, variations in the decline rate of the thermal neutron population, as the source and detector are passed through the well, will furnish a direct indication of the relative capturing effect had by one formation as compared to another.

As hereinbefore stated, the detector is preferably gated in logging apparatus of this type, so that the detector may be selectively rendered responsive or unresponsive to incident radiations during one or more preselected time intervals during and, or following each fast neutron pulse. Each fast neutron pulse preferably has a duration of from one to about twenty microseconds in duration, and the fast neutron population created thereby will decline away within an interval which is usually almost coincident with the duration of the neutron pulse. Thus, if the fast neutron population (or the inelastic scattering gamma ray population produced thereby) is sought to be measured, it is necessary to actuate the detector with, or almost coincident with, the occurrence of the fast neutron pulse. Furthermore, it is desirable to terminate the detection interval with or almost coincident with the termination of the neutron pulse, in order to exclude detection of any thermal neutron capture gamma radiation which arises in conjunction with the rise of the thermal neutron population.

If, on the other hand, it is sought to measure the decline rate of the thermal neutron population in the well, it is preferable to initiate the detection interval only after the fast and epithermal neutron population has disappeared, and to terminate the detection interval before the disappearance of the thermal neutron (or capture gamma ray) population.

It will be apparent to those skilled in this art that the contents of a fluid-filled borehole will always be hydrogenous in character, whether such fluids are composed of brine from the formations, drilling mud injected from the surface, or hydrocarbons from an oil-bearing formation. Accordingly, the macroscopic capture cross section of the borehole substances will generally be greater than the macroscopic capture cross section of reservoir rocks. In such cases the thermal neutrons in the borehole will be captured faster than those in the formations surrounding the borehole. If the detector is made responsive to gamma radiation, and if the initiation of the detector interval is delayed until after the thermal neutrons in the borehole have substantially all disappeared, then the measurement will be substantially limited to gamma radiation arising from capture reactions only in the formations, and the measurement will therefore be substantially independent of variations in borehole shape and diameter, and the chemical characteristics of the borehole constituents.

It will also be apparent that, while the measurement of the decline rate of the thermal neutrons in the formations may be made independent of the borehole, the measurement of the decline rate will always be subject to variations occurring in the macroscopic capture cross section of the formation matrix which have no relationship to the type or extent of any fluids therein. For example, the rock matrix may include an abnormal and unexpected percentage of some element such as boron, or gadolinium. Consequently, the decline rate of the thermal neutron population in such a formation will be abnormally high, and will thus suggest the presence of brine rather than oil, or of fluid filled pore space when there may actually be no fluid whatsoever in the formation. If, however, the macroscopic capture cross section of the formation material were known to be abnormally high, then the logging measurement could be effectively and correctly evaluated. Prior to the present invention, it was necessary to make a chemical analysis of a core or of drill cuttings, to determine the composition of the formation matrix, and from this chemical analysis a computation of the macroscopic capture cross section could then be made. However, any analysis which discovers the presence and proportion of 2–5 p.p.m. of gadolinium would require special techniques which are not routinely available. Accordingly, such determinations cannot be attempted on a commercial basis. Notwithstanding, the present invention functions to provide a relatively quick and accurate determination, not of the chemical constituency of the formation matrix materials, but rather of the macroscopic capture cross section per se, which is the parameter ultimately sought to be obtained by analytical techniques of the prior art.

Referring now to FIGURE 1, there may be seen a tank 2 which is filled with an appropriate material 4, such as quartz sand, which has a relatively low predetermined thermal neutron macroscopic capture cross section. A gamma ray detector 6 is preferably centrally positioned in the material 4, and a pulsated fast neutron source 8 is positioned adjacent the tank 2. Any suitable source 8 may be used for these purposes, such as that described in the co-pending application S./N. 259,073, which was filed Feb. 18, 1963, by A. H. Youmans and E. C. Hopkinson, the continuation application thereof having now matured into U.S. Patent No. 3,309,522. The detector 6 is preferably connected to a conventional count rate meter and recorder 10.

Figure 2:
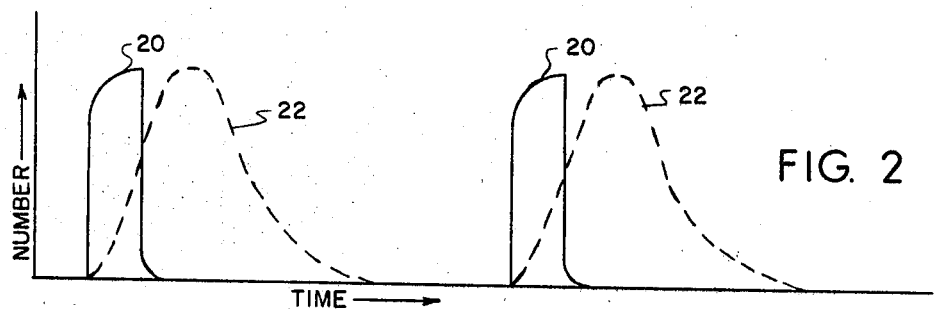
FIGURE 2 is a diagrammatic representation of the rise and decline of the fast neutron population created by each of a sequence of similar fast neutron pulses, together with a diagrammatic representation of the rise and decline of the thermal neutron population created by the decline of each fast neutron population.

Referring now to FIGURE 2, there may be seen a graphical representation of the fast neutron population 20 created in the material 4 by each burst of neutrons produced by the source 8. Although the graphic representations of the fast neutron populations 20 are not drawn to scale, it may be seen how they rise to a peak almost instantaneously upon their creation, and how their decline is equally abrupt. However, FIGURE 2 also shows how the decline of each fast neutron population 20 is accompanied by a corresponding rise of the thermal neutron population 22, and that the rise and decline of the thermal neutron population 22 is much more gradual.

Accordingly, after the decline rate of the thermal neutron population 22 in the material 4 has been measured, a weighed and measured sample of formation fluid or a granulated quantity of formation matrix may be introduced into and mixed with the material 4 in the tank 2. Thereafter, the material 4 and sample to be measured may be again irradiated by the source 8, and the decline rate of the thermal neutron population 22 therein may be determined for the mixture. A comparison of the decline rates for the material 4 alone, and for the mixture of material 4 and the sample of fluid or granulated matrix, may then be made.

It has been shown that the "lifetime" of the thermal neutron population 22 is related to the elemental constituents of the formation matrix, including any fluids contained therein, by the expression:

$$L = \frac{3.15}{\Sigma} \quad (1)$$

where $L$ represents the time in microseconds required for the thermal neutron flux to fall to half value, and where $\Sigma$ represents the thermal macroscopic capture cross section of the matrix and fluids. Of course, the macroscopic capture cross section of the matrix and fluids is a function of the capture cross section of each element therein, and of the relative proportion of each such element to the overall sample. Accordingly, the macroscopic capture cross section of the sample may be stated as:

$$\Sigma = \Sigma_a + \Sigma_b + \Sigma_c + \Sigma \text{other} \quad (2)$$

where $\Sigma_a$ is the product of the atomic capture cross section of element $a$ and the number of atoms of element $a$ per cc. of matrix, $\Sigma_b$ is a similar product for element $b$, etc. In the case of a water saturated formation:

$$\Sigma = \Sigma H + \Sigma Cl + \Sigma Na + \Sigma Si + \Sigma \text{other} \quad (3)$$

For example, $\Sigma Cl = \phi C(0.324)$ where $C$ is the NaCl concentration in grams per cc. of solution, and where $\phi$ is the pore volume per cc. of the matrix. Accordingly:

$$\Sigma H = \phi (0.66 \times 10^{23})(0.33 \times 10^{-24}) \quad (4)$$

or $$\Sigma H = \phi (0.022) \quad (5)$$

In general, it is desired to employ the aforementioned logging technique to measure $\phi$ or $C$, i.e., to determine either the porosity or the salinity of a formation. The log is influenced not only by $\phi$ and $C$ but also by the macroscopic cross section of the rock matrix, $\Sigma$ rock. Obviously $\Sigma$ rock, $\phi$ and $C$ cannot all be determined from a single measurement. However, if any two are predetermined (or are negligibly small), then by means of a determination of the decline rate of the thermal neutron population the value of the one remaining unknown quantity can be determined. In other words, if porosity and rock chemistry are known, then the log can provide a measurement of the salinity of the formation. The present invention provides a means to predetermine the macroscopic capture cross section of the rock or of the formation fluid, if samples of the respective materials are available.

With reference again to FIGURE 1, the initial measurement of the lifetime of the thermal neutron population 22, in the original material 4, may be stated as follows, where $o$ is the original material 4:

$$L_o = \frac{3.15}{\Sigma_o} \quad (6)$$

and the lifetime of the thermal neutron population 22, in the mixture, may be stated as follows:

$$L = \frac{3.15}{\Sigma_o + \Sigma_{core}} \quad (7)$$

or $$\Sigma_{core} = 3.15 \left( \frac{1}{L} - \frac{1}{L_o} \right) \quad (8)$$

Thus, the present invention effectively provides the macroscopic capture cross section of the core or fluid sample without the necessity of a difficult and expensive chemical analysis.

It will be apparent that measurement of the macroscopic capture cross section of the sample will be greatly facilitated by the use of a source 8 having a relatively high intensity output, and by the use of a relatively large volume of not only the sample material but also of the volume of the quartz sand material 4. Accordingly, the source 8 should preferably be one which provides more than $10^7$ neutrons per second and the tank 2 should preferably be large enough to hold at least one cubic meter of material 4.

In theory, the detector 6 may be chosen to be responsive to either gamma rays on the one hand or thermal neutrons on the other hand. However, in many cases the samples which may be available may be small. In such cases it may be preferable to locate the sample in a centrally-disposed container 7, rather than to disperse the core sample evenly throughout the quartz sand material 4. This will cause a relatively greater alteration in the macroscopic capture cross section in the immediate vicinity of the sample and thus the detector 6 might preferably be made responsive to thermal neutrons.

If the sample material is thus located in the central container 7, the macroscopic capture cross section measurement may not be exactly correct from a quantitative standpoint, depending upon the particular dimensions of the apparatus employed. Thus, it may be necessary to calibrate the measurement by predetermining the exact effect of various known sample materials. By thus making calibration measurements with chemically pure prepared samples of material in the container 7 which have a known capture cross section, the capture cross section of an unknown sample may be inferred from the measurement.

While it is theoretically possible to bombard the quartz sand in tank 2 with only a single burst of fast neutrons from source 8, measure the lifetime of the single thermal neutron population created therein, thereafter bombard the mixture of the core sample and quartz sand with a single burst of fast neutrons, and then measure the lifetime of the single thermal neutron population created in the mixture, such a procedure would probably be impractical. It is preferable, rather, to cause the source 8 to emit neutron pulses at a rate of 1,000–5,000 pulses per second for at least several seconds, and to measure the average lifetime of the thermal neutron populations created thereby.

Although FIGURE 1 shows that container 7 is centrally located in tank 2, it may be desirable under certain circumstances to eccentrically position the unknown sample in the tank 2. This is feasible, provided the sample is positioned so that it appreciably alters the thermal neutron lifetime of the thermal neutron population measured by the detector. Such an effect can result whether the core sample is in the center of the tank 2, to one side, or dispersed evenly in granulated form throughout the quartz and material 4. It is then only required that the observed effect be calibrated by experimentally observing the effect of known samples having the same space distribution as the samples to be measured. Thus, in cases where it is undesirable to granulate or otherwise break up the core sample, it may be merely inserted or imbedded intact more or less anywhere within the quartz sand material 4. From a practical sense, however, it is desirable to locate the sample as close as possible to the detector 6 in container 7.

As hereinbefore stated, it is the macroscopic capture cross section of the matrix of the formation substances which is primarily sought to be measured with the present invention. Accordingly, it is desirable to flush or otherwise wash the core sample, before irradiating it, to first remove any formation fluid therefrom. Care should be exercised, however, that such washing does not eliminate any compounds of boron or gadolinium, etc., which may be dissolved in the fluid but which bear no relationship to the character of the fluid.

Figure 3:
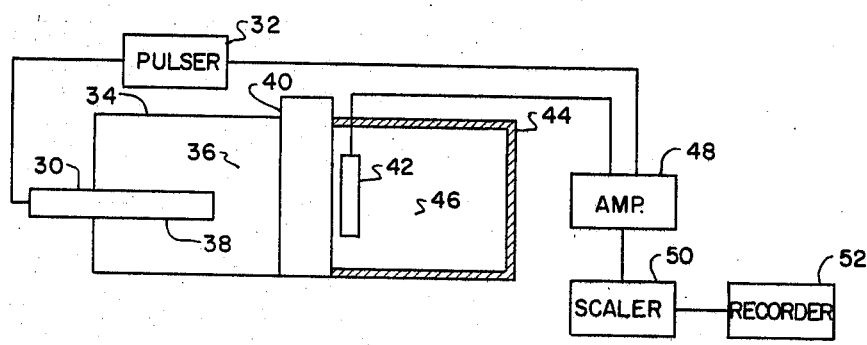
FIGURE 3 is a modified version of the apparatus depicted in FIGURE 1.

Referring now to FIGURE 3, there may be seen an alternative form of the apparatus depicted in FIGURE 1, including a D-T accelerator 30 for generating high energy neutrons, a pulser 32 for causing the accelerator 30 to produce the neutrons in bursts or "pulses" at a preselected frequency, and a jacket 34 containing a moderator 36 surrounding the target 38 portion of the accelerator 30. The moderator 36 may be any suitable material, such as paraffin, which effectively slows all or at least most of the high energy neutrons to thermal energy before they escape from the confines of the jacket 34. Thus, the combination of the accelerator 30 and moderator 36 functions to produce a pulsed output of thermal neutrons.

Figure 4:
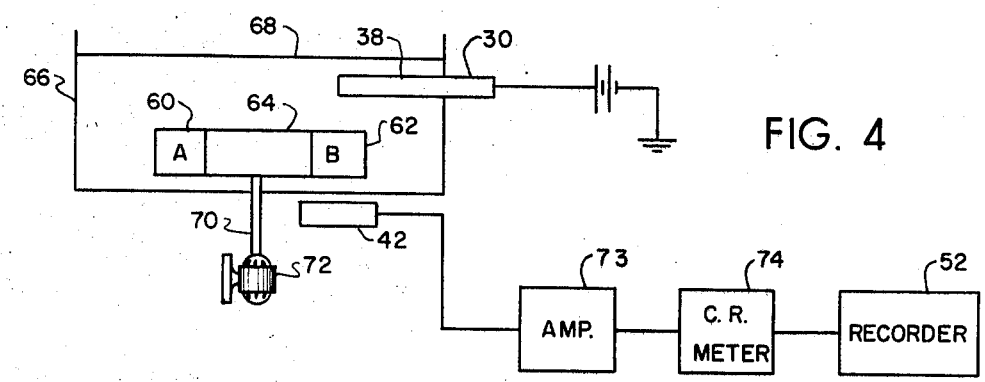
FIGURE 4 is a modified version of the apparatus depicted in FIGURE 3.

Located adjacent the jacket 34 is a container 40 in which the core material may be placed, and adjacent the container 40 there is located a thermal neutron detector 42, such as a boron trifluoride counter of conventional design. The detector 42 is preferably surrounded on all sides, except that adjacent the container 40, by a housing 44 of cadmium or some other substance having a high thermal capture cross section so as to prevent thermal neutrons from striking the detector 42 except by way of the container 40. The cadmium housing 44 may extend some distances from the detector, as shown in FIGURE 4, and may contain a non-absorbing substance 46 such as graphite or heavy water. Alternatively, the housing 44 may contain air.

The output of the detector 42 is connected to a gated amplifier 48 which is gated in synchronism with the pulser 32 to refuse signals from the detector 42 equivalent to the time following each neutron pulse sufficient for all epithermal neutrons to slow to thermal energy. The output of the amplifier 48 is passed to a conventional scaler or rate meter 50, where the pulses are counted, and the output of the scaler 50 may then be applied to a suitable recorder 52.

In using the apparatus depicted in FIGURE 3, the measurement primarily sought to be made is that of the relative number of thermal neutrons which diffuse or pass through the substances in the container 40 during a preselected time interval. Such a measurement is a function of the capture cross section of the substances in question, and it may be compared with a measurement taken of a standard material having a known capture cross section as hereinbefore described.

Referring now to FIGURE 4, there may be seen a further modification of the apparatus hereinbefore described, wherein a holder 60 for containing the core sample A is mounted at one end of a horizontal beam 64, and a holder 62 for containing the preselected standard substance B is mounted at the other end. The beam 64 is arranged in a tank 66 containing a moderator 68 such as water, and is mounted on a shaft 70 connected to a suitable electric motor 72. Accordingly, the beam 64 may be revolved so as to swing first the core sample A, and then the standard substance B, between the target end 38 of the accelerator 30 and the detector 42. The output of the detector 42 is then connected to the recorder 52 by way of an amplifier 73 and a count rate meter 74. In this form of the present invention, the irradiated substance is "pulsed," rather than the accelerator 30. Thus it is possible to employ a conventional radioactive capsuled source of neutrons instead of the accelerator 30.

Figure 5:
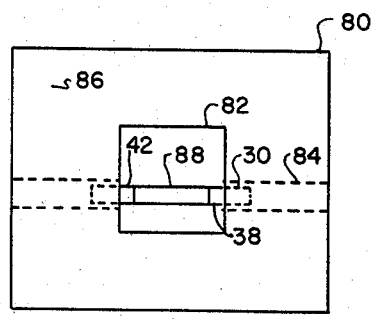
FIGURE 5 is a modified version of the apparatus depicted in FIGURE 4.

Referring now to FIGURE 5, there is depicted an overhead view of apparatus primarily intended for use in measuring the capture cross section of a relatively small sample of material, including a relatively large tank 80 having a centrally located compartment 82, and having a passageway 84 through the tank 80 and opening into the compartment 82. The tank 80 is preferably filled with some suitable material 86 having a relatively small predetermined capture cross section. For example, so-called "frac sand" (granulated silicon dioxide crystals) may be used. In addition, an accelerator 30 and a thermal neutron detector 42 is disposed in the passageway 84 so that the target end 38 of the accelerator 30 is inside the compartment 82. A suitable shield 88 is preferably disposed between the detector 42 and the target end 38 of the accelerator 30, so as to prevent direct irradiation of the detector 42.

As hereinbefore stated, the tank 80 is filled with material 86 such as frac sand. Furthermore, the compartment 82 is also initially filled with the same material 86 as is located in the tank 80, and a first measurement is then made by pulsing the accelerator 30 with apparatus such as hereinbefore described. Thereafter, the sample material may be dispersed or pulverized and then intimately and thoroughly mixed with the material 86 in the compartment 82, and the accelerator 30 and detector 42 again actuated. Inasmuch as the material 86 has relatively small capture cross section, the lifetime of the thermal neutron population created by each pulsation of the accelator 30 will be relatively long, during the first measurement. However, the second measurement will indicate a shorter lifetime, for the thermal neutron populations in the compartment 82, due to the addition of the core sample substances, and thus the difference between the two measurements of the lifetime of the thermal neutrons will provide the basis for determining the capture cross section of the core sample material. If the capture cross section of the core sample is sufficiently large, it may be possible to derive it from a single pair of measurements. However, in most cases it is preferable to derive it from an average of a series of measurements. In any event, the relationship of the first and second measurements may be stated as follows:

$$a\Sigma \text{sand} + b\Sigma \text{core} = \Sigma \text{measured} \quad (9)$$

where $a$ and $b$ are the volumetric proportions of the material 86 and the core sample.

If the core sample material is granular in form, then it may be preferable to remove the material 86 from the compartment 82, and to entirely replace it with the core sample substances, before performing the second measurement. On the other hand, if the core sample substance can be pulverized to an extent such that it can be added to the compartment 82 without displacing any of the material 86 located therein, then the second measurement can be performed as hereinbefore described. However, in such a case, the relationship is more properly stated as follows:

$$\Sigma \text{ measured} = \Sigma \text{ sand} + \frac{S}{a} \Sigma \text{ core} \quad (10)$$

where $S$ is the volume of the core sample before being pulverized, and $a$ is the volume of the portion of material 86 in the compartment 82.

As hereinbefore stated, the apparatus depicted in FIGURE 5 is primarily intended for use with dry substances. However, the apparatus can be used to measure the capture cross section of unknown liquids, provided that the liquid to be investigated is uniformly dispersed within the material 86 in the compartment 82 without altering its specific density, and provided that measures are taken to prevent the liquid from flowing out through the passageway 84.

Figure 6:
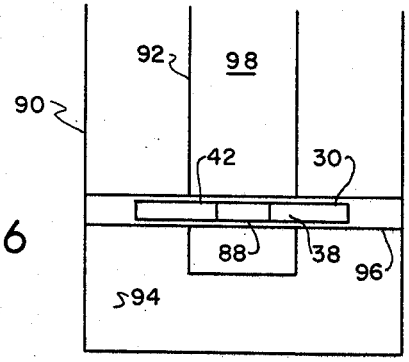
FIGURE 6 is a modified version of the apparatus depicted in FIGURE 5.

Referring now to FIGURE 6, there may be seen apparatus primarily intended for the purpose of providing a measurement of the capture cross section of the core sample, when such capture cross section is relatively small. In principle, this form of the present invention operates to measurably reduce, rather than to increase, the macroscopic capture cross section of the standard material having a predetermined capture cross section. In FIGURE 6 there may be seen, in side cross sectional view, a tank 90 having a centrally located inner compartment 92, and having a walled passageway 96 extending laterally throughout the tank 90 and compartment 92. A pulsed and gated accelerator 30 and detector 42, which are separated by a neutron shield 88, are disposed in the passageway 96 so that the target end 38 of the accelerator 30 is within the compartment 92.

Initially, the tank 90 and compartment 92 are both filled with a standard material 94 having a preselected large capture cross section, and a first measurement is taken of the lifetime of a thermal neutron population within the compartment 92. Thereafter, the core sample 98 is pulverized and then substituted within the compartment 92 for an equivalent amount of the standard material 94 initially disposed therein, and a second "lifetime" measurement is then made. The relationship of the two measurements may be stated as follows:

$$\Sigma \text{ measured} = \left(1 - \frac{a}{A}\right) \Sigma \text{ standard} + \frac{a}{A} \Sigma \text{ core} \quad (11)$$

where $a$ is the volume of the core sample before being pulverized, and $A$ is the total volume of the pulverized core sample and standard material in the compartment 92.

As hereinbefore stated, it is an object of the present invention to obtain a measurement of the oil saturation of a fluid-bearing earth formation. In order to make such a measurement, however, the porosity of the formation ($\phi$), the thermal neutron capture cross section of the oil in the formation ($\Sigma$ oil), and the thermal neutron capture cross section of the water in the formation ($\Sigma$ water), must first be determined. The porosity of the formation may be determined by conventional methods and apparatus which are well known in the industry, and therefore need not be further described. The cross section oil of "typical" oil has been determined to be about 0.022 cm.$^2$/cm.$^3$. The type of water encountered in the formation to be investigated is in general known or can be determined by means well known in the art. If desired, oil and water may be determined by taking samples from the formation and by analyzing them by chemical means, or by measuring these samples as hereinbefore explained.

The well logging measurement disclosed and explained in the aforementioned patent application S.N. 292,927, may be employed to provide the macroscopic thermal neutron capture cross section of the formation substances according to the relationship:

$$\Sigma \text{ formation} = k \log \frac{N_2}{N_1} \quad (12)$$

where $N_1$ is the number of radiations detected during the first detection interval following the neutron pulse, $N_2$ is the number of radiations detected during the second such interval, and $K$ is a preselected constant. The macroscopic thermal neutron capture cross section of the formation may also be expressed as follows:

$$\Sigma \text{ formation} = A\Sigma_{\text{matrix}} + B\Sigma_{\text{fluid}} + C_{\text{other}} \quad (13)$$

where $\Sigma_{\text{other}}$ represents the thermal neutron capture cross section of any other substances such as gas and mud filtrate. For simplicity, the absence of gas and other significant substances will be assumed in the following explanation, although this is seldom true in practice. Therefore, the equation may be restated as follows:

$$\Sigma \text{ formation} = A\Sigma_{\text{matrix}} + B\Sigma_{\text{fluid}} \quad (14)$$

where $A$ and $B$ represent the fractional portions of a unit of the formation, and where $C$ is assumed to be zero. $A+B$, of course, equal unity. Therefore, the equation may be further stated as follows:

$$\Sigma \text{ formation} = (1-\phi)\Sigma_{\text{matrix}} + \phi\Sigma_{\text{fluid}} \quad (15)$$

or, $$\Sigma \text{ formation} = a\Sigma_{\text{matrix}} + b\Sigma_{\text{water}} + c\Sigma_{\text{oil}} \quad (16)$$

where $a$, $b$, and $c$ are respectively equal to the fractional percentages of a unit of the formation, and where their sum is equal to unity. Therefore, $$\Sigma \text{ formation} = a\Sigma_{\text{matrix}} + S_w\phi\Sigma_{\text{water}} + S_o\phi\Sigma_{\text{oil}} \quad (17)$$

where $S_o$ plus $S_w$ equals unity, and represent the fractional portions of the water in a unit of the formation. Accordingly, the equation may be stated as follows:

$$\Sigma \text{ formation} = (1-\phi)\Sigma_{\text{matrix}} + S_w\phi\Sigma_{\text{water}} + (1-S_w)\phi\Sigma_{\text{oil}} \quad (18)$$

As hereinbefore stated, $\phi$, $\Sigma_{\text{water}}$, and $\Sigma_{\text{oil}}$, have been predetermined. $\Sigma_{\text{matrix}}$ may be determined by the methods and apparatus herein disclosed, and formation may be determined by means of Equation 12. Accordingly, $S_w$ is the only unknown and may be easily determined. When $S_w$ in found, however, then $S_o$ follows automatically.

Numerous other variations and modifications may obviously be made without departing from the essential concepts of the present invention. Accordingly, it should be clearly understood that the forms of the invention described herein and shown in the figures of the accompanying drawings are illustrative only and are not intended to limit the scope of the invention.

What is claimed is:

1. A method of investigating the character of an earth sample comprising:
   establishing in a preselected substance a first population of neutrons of a preselected energy,
   thereafter measuring a characteristic parameter of said first neutron population in said preselected substance,
   mixing said earth sample and said preselected substance,
   establishing simultaneously in said earth sample and said preselected substance a second population of neutrons of said preselected energy,
   thereafter measuring the same characteristic parameter of said second neutron population in said preselected substance and earth sample, and
   comparing the measurement of said parameter of said first neutron population with the measurement of said parameter of said second neutron population.

2. A method of investigating the character of an earth sample comprising the steps of
   irradiating a preselected substance with neutrons in a manner to establish therein a first population of neutrons of a preselected energy,
   measuring the rate at which said first population of neutrons declines away and disappears, mixing said earth sample and said preselected substance,
   irradiating both said earth sample and said preselected substance simultaneously with neutrons in a manner to establish therein a second population of neutrons of a preselected energy,
   measuring the rate at which said second population of neutrons declines away and disappears, and
   comparing the measurement of the rate at which said first neutron population declines away and disappears with the measurement of the rate at which said second neutron population declines away and disappears.

3. A method of investigating the character of an earth sample comprising the steps of
   irradiating a preselected substance with a first series of bursts of fast neutrons to establish therein a first population of thermal neutrons,
   measuring the period during which said first thermal neutron population declines away and disappears,
   combining said earth sample and said preselected substance,
   irradiating said combined earth sample and said preselected substance with a second burst of fast neutrons to establish therein a second population of thermal neutrons,
   measuring the period during which said second thermal neutron population declines away and disappears, and
   comparing the measurement of the period during which said first thermal neutron population declines away and disappears with the measurement of the period during which said second thermal neutron population declines away and disappears.

4. A method of investigating the character of the substances composing a subsurface earth formation, said method comprising
   establishing in said formation a first population of thermal neutrons,
   thereafter measuring the rate of decline of said thermal neutrons in said formation,
   establishing in a preselected different substance a second population of thermal neutrons,
   thereafter measuring the rate of decline of said thermal neutrons in said different substance,
   taking a sample of said formation substances, mixing said sample and said different substance,
   establishing a third thermal neutron population simultaneously in the mixture of said sample and said preselected different substance,
   deriving a first comparison of the rates of decline of said second and third neutron populations, and
   deriving a second comparison of said first comparison and said measured rate of decline of said first neutron population.

5. A method of investigating the character of a fluid-bearing subsurface earth formation, said method comprising
   establishing in said formation a first thermal neutron population,
   thereafter measuring the rate of decline of said first population of thermal neutrons,
   establishing a second thermal neutron population in a quantity of a preselected substance having a known thermal neutron capture cross section,
   thereafter measuring the rate of decline of said second thermal neutron population,
   taking a sample of the matrix of said formation, mixing said sample and said quantity of preselected substance,
   establishing a third thermal neutron population simultaneously in the mixture of said sample and said quantity of preselected substance,
   thereafter measuring the rate of decline of said third thermal neutron population,
   comparing the rates of decline of said second and third thermal neutron populations to determine the thermal neutron capture cross section of said matrix,
   deriving the macroscopic thermal neutron capture cross section of said formation as a function of said rate of decline of said first population, and
   thereafter deriving the fluid saturation of said formation as a function of said macroscopic thermal neutron capture cross section of said formation and said thermal neutron capture cross section of said matrix.

References Cited

UNITED STATES PATENTS

| 2,840,717 | 6/1958 | DeWitte | 250—83 |
| 3,102,956 | 9/1963 | Armistead | 250—71.5 X |

RALPH G. NILSON, *Primary Examiner.*

A. B. CROFT, *Assistant Examiner.*

U.S. Cl. X.R.

250—83, 83.1